Figure 1:
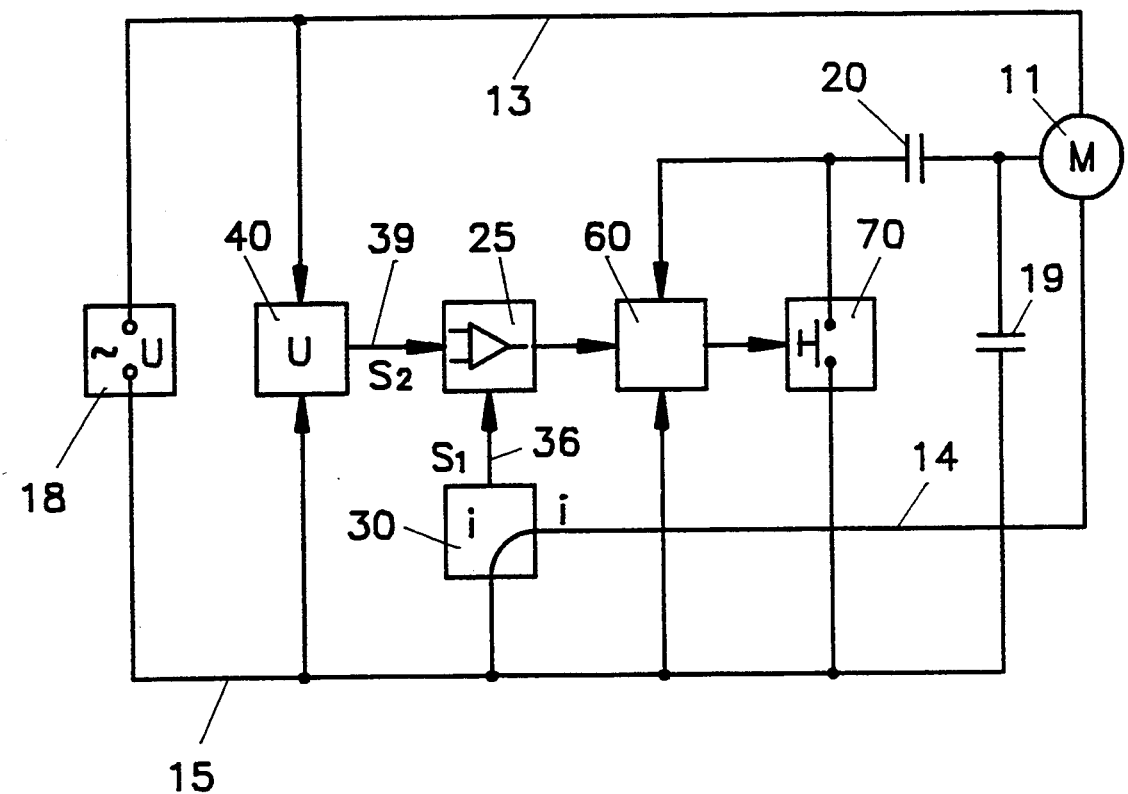

United States Patent [19]

Flückiger

[11] Patent Number: 5,359,273
[45] Date of Patent: Oct. 25, 1994

[54] LOAD-CONTROL CIRCUIT FOR A MAINS-POWERED ASYNCHRONOUS SINGLE-PHASE CAPACITOR MOTOR

[75] Inventor: Daniel Flückiger, Walkringen, Switzerland

[73] Assignee: Ascom Hasler Mailing Systems AG, Bern, Switzerland

[21] Appl. No.: 969,169

[22] PCT Filed: Jun. 4, 1992

[86] PCT No.: PCT/CH92/00107
    § 371 Date: Feb. 2, 1993
    § 102(e) Date: Feb. 2, 1993

[87] PCT Pub. No.: WO92/22126
    PCT Pub. Date: Dec. 10, 1992

[30] Foreign Application Priority Data

Jun. 7, 1991 [CH] Switzerland .................. 01 697/91-7

[51] Int. Cl.$^5$ ............................................. H02P 7/622
[52] U.S. Cl. ................................ 318/794; 318/795; 318/805
[58] Field of Search ............... 318/751, 752, 794, 795, 318/796, 798, 805

[56] References Cited

U.S. PATENT DOCUMENTS

| | | | |
|---|---|---|---|
| 4,675,565 | 6/1987 | Lewus | 318/794 X |
| 4,703,387 | 10/1987 | Miller | 361/79 |
| 4,806,838 | 2/1989 | Weber | 318/729 |
| 4,885,655 | 12/1989 | Springer et al. | 318/790 X |

FOREIGN PATENT DOCUMENTS

| | | |
|---|---|---|
| 390533 | 5/1990 | Austria . |
| 4023749 | 5/1991 | Fed. Rep. of Germany . |
| 663698 | 12/1987 | Switzerland . |

OTHER PUBLICATIONS

Publication: "Hasler Mailmaster F 204–Franking Machine" Hasler Review, vol. 11, No. 1.

*Primary Examiner*—Bentsu Ro
*Attorney, Agent, or Firm*—Horst M. Kasper

[57] ABSTRACT

Disclosed is a circuit for controlling the load of an asynchronous motor (11), the circuit comprising two capacitors (19, 20), one of which (20) can be connected, by means of a switch (70), in parallel with the other (19). Control is provided by a current sensor (30) and a voltage sensor (40), whose signals ($S_1$, $S_2$) are compared by a comparator (25). Depending on the relative size of the signals ($S_1$, $S_2$) a switch control unit (60) with relaxation hysteresis characteristics switches the switch (70) on or off. The circuit is simple, operates independently of the mains voltage (U) being used and its switch point can be adjusted by means of the current sensor (30).

9 Claims, 2 Drawing Sheets

LOAD-CONTROL CIRCUIT FOR A MAINS-POWERED ASYNCHRONOUS SINGLE-PHASE CAPACITOR MOTOR

The invention relates to load-control circuit for a mains-operated single-phase asynchronous capacitor motor corresponding to the preamble of claim 1. The invention relates further to the use of such a circuit in a postage metering machine.

Asynchronous capacitor motors, which are operated at the general single-phase mains (for example 220 V, 50 Hz) are known in general and widespread. They are economical, sturdy, and operate without service requirements. In addition to their positive properties, however, they are also associated with disadvantages. The asynchronous capacitor motors have a poor efficiency, which is in general below 50%. Thereby a relatively large power dissipation is always generated, where the power dissipation can heat the motor windings up to critical temperatures of above 100° C. This substantial power dissipation is also present during idling of the motor.

It is further known that asynchronous capacitor motors furnish only a relatively small starting torque during the starting from a standstill. For improving of this property an additional capacitor can be connected to the motor capacitor for starting.

A postage metering machine is known from Hasler Review, Vol. 11, 1978, No.1, pages 2–7, which postage metering machine includes an asynchronous capacitor motor as a drive. This motor runs in the substantially idling state after the switching on of the machine, wherein the motor drives the pull-in rollers for the letters to be metered. As soon as the letter is to be metered, the print rotor of the machine is coupled to the motor and accelerated through a coupler. The mechanical load of the capacitor motor increases substantially for a short time during this procedure.

The mode of operation of the capacitor motor is thus such that the capacitor motor is loaded predominantly only very little in order to be loaded substantially more over a short time period. The strength of the load depends in this case also on the kind of the letters which have to be metered, in particular on the thickness of these letters, where the thickness can vary between less than 1 mm and about 8 mm.

The construction of the capacitor motor in this case is directed to the load peaks whereby, in case of a weak load, there result relatively unfavorable operating conditions and where, based on the unfavorable operating conditions, the complete postage metering machine is subjected to a substantial thermal load.

It is an object of the invention to furnish a general drive motor for a postage metering machine with its specific kind of motor load, where the drive motor generates substantially less heat than up to now while maintaining the general costs at the same level.

The solution of this object is furnished by the characterizing part of the independent claims. The dependent claims provide specific embodiments of the invention.

The invention is described in the following in more detail by way of the examples in two figures. There is shown in:

FIG. 1— schematic diagram of a load-control circuit.

Figure 2:
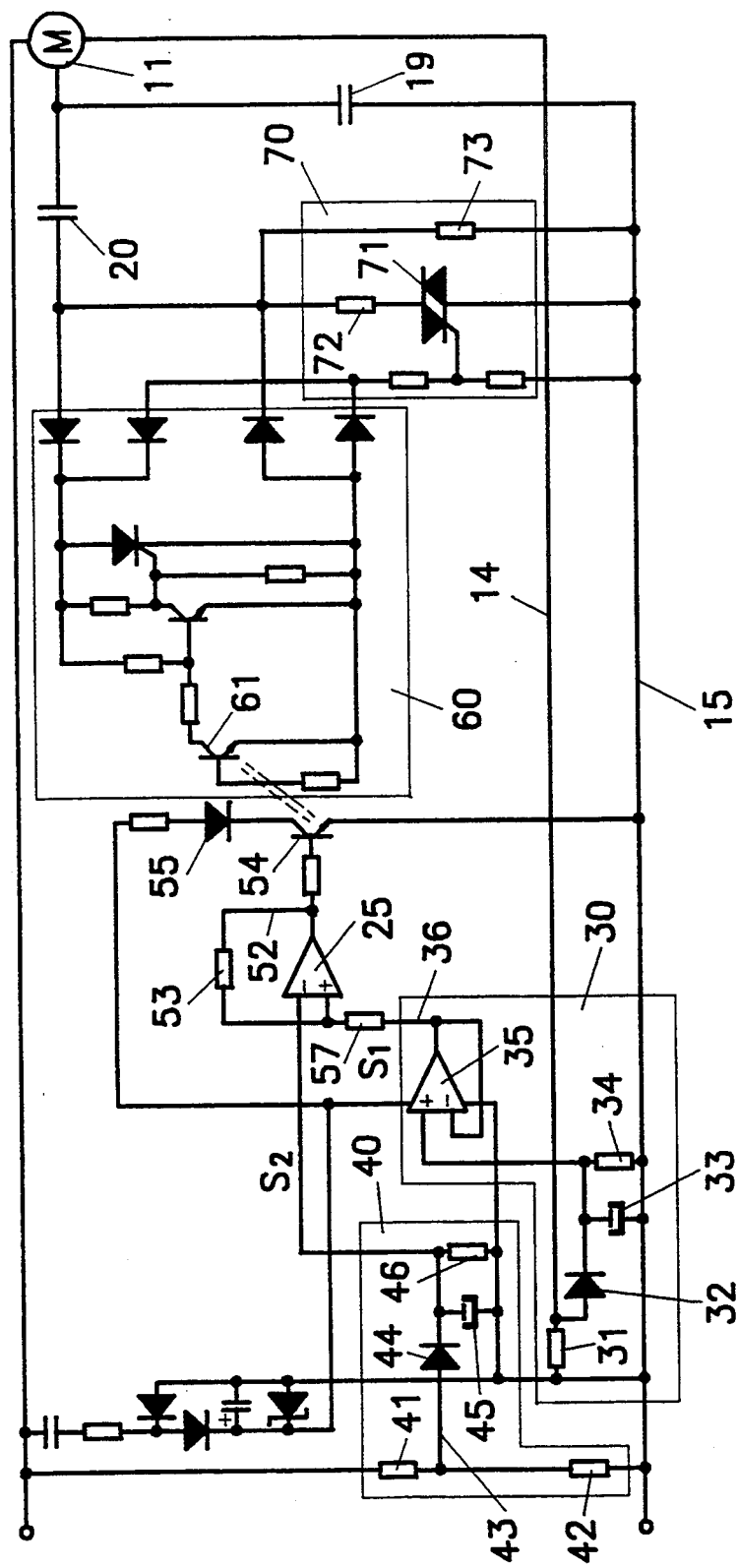

FIG. 2— detailed switching diagram of the load-control circuit.

FIG. 1 shows the schematic diagram of a load-control circuit for a mains-operated single-phase asynchronous capacitor motor 11. This motor 11 is constructed for example with four poles. The main windings of the motor are connected through the connections 13, 14 as well as 15 to a single-phase alternating-current mains of the standard 220 V, 50 Hzb, or 110 V, 60 Hz, for example through a mains plug 18. A first capacitor 19 is connected to a shunt winding of the motor 11, and this shunt winding is connected to the connection 15 with alternating current through which capacitor 19.

The arrangement described so far corresponds to a generally known capacitor motor, wherein the windings of the motor 11 and the capacity value of the first capacitor 19 are tuned in such a way to each other that optimum situations result in connection with the substantially unloaded running of the motor 11, i.e. in particular a lowest possible power dissipation.

There is now provided a second capacitor 20, where the second capacitor 20 can be connected to the motor by means of a switch arrangement 70 in parallel to the first capacitor 19. The capacitance value of the two capacitors 19, 20 together is thereby selected such that the motor 11 can handle substantial load peaks without problems, wherein the load peaks, however, are in each case extending only over a relatively short time.

The load-control circuit comprises further a current sensor 30, a voltage sensor 40, a comparator 25 with a relaxation hysteresis and a switch control unit 60.

The current sensor 30 detects continuously the current strength in the connection line 14, where the current strength in the line 14 corresponds to the current strength in the main winding of the motor 11. The current sensor 30 further delivers at its output 36 a first direct current signal $S_1$, which direct current signal $S_1$ is proportional to the current i. The voltage sensor 40, in parallel to the current sensor 30, detects continuously the mains voltage U and delivers at its output 39 a second direct current signal $S_2$, where the second direct current signal $S_2$ is proportional to the voltage U. The two direct current signals $S_1$, $S_2$ are continuously compared in the comparator 25. As soon as the first signal $S_1$ becomes larger than the second signal $S_2$, the comparator 25 flips out of its rest position into its working position. If the second signal $S_2$ becomes again larger than the first signal $S_1$ then the comparator 25 flips back into its rest position. The relaxation hysteresis is generated thereby based on two slightly different relaxation values of the comparator 25 and prevents a possible oscillation of the comparator 25 in case the two signals $S_1$, $S_2$ have equal values.

The switch arrangement 70 is preferably produced as a semiconductor switch, for example as a triac. The switch control 60 is connected in series to the semiconductor switch, where the switch control 60 prevents a damaging of the switch. In particular, the switch control 60 makes provisions that the semiconductor switch is only switched on in case of a zero passage of the voltage.

FIG. 2 shows the circuit diagram of a preferred embodiment of the load-control circuit. The current sensor 30 comprises a low resistance measuring resistor 31, which is inserted into the connection line 14. The voltage drop at this resistor 31 is proportional to the main winding current of the motor 11, the voltage drop is rectified by a diode 32 and is smoothed by a the capacitor 33, where a high-resistance discharge resistor 34 is switched parallel to the capacitor 33. The generated sensor voltage is buffered in an operational amplifier 35 and is delivered as first direct voltage signal $S_1$ by the connection line 36 to the plus input of the comparator 25. The diode 32 and the capacitor 33 form in this case, generally considered, a very simple rectifier and filtering device.

The voltage sensor 40 comprises a voltage divider comprising two resistors 41, 42, where the voltage divider is connected to the connection lines 13, 15, and where a diode rectifier 44 and a smoothing capacitor 45 with parallel-connected discharge resistor 46 is connected to the tap 43 of the voltage divider for the formation of a second direct current signal $S_2$.

The comparator 25 with relaxation hysteresis is formed by an operational amplifier, where the operational amplifier feeds back through a resistor 53 from its output 52 to its plus input (+) and is connected through a further resistor 57 to the output 36 of the current sensor 30. The recited relaxation hysteresis is generated and the relaxation values are set based on this wiring circuit. The output 52 of the comparator 25 controls a light-emitting diode (LED) 55 with a transistor 54, where the light-emitting diode 55 is part of an optical coupler.

The optical coupler separates the relaxation circuit 50 and the switch control unit 60 relative to voltage. The switch control unit 60 has the purpose to switch the switch of the switch arrangement 70 in each case then, when the phototransistor 61 of the optical coupler responds and when the respective next zero passage of the voltage applied to the switch occurs. For this purpose, a zero-voltage detector circuit is connected following to the phototransistor 61, such as the zero-voltage detector circuit described in "Thyristors & Triac Application Manual 1989" of the corporation SGS-Thomson, pages 57 and ff.

The switch arrangement 70 comprises a triac 71 as a switch, where the triac 71 is switched on by the switch control unit 60, as described above, in case of a zero passage of the alternating current voltage. For safety purposes, a resistor 72 is connected in series with the triac 71, which resistor 72 can limit nevertheless possibly occurring current peaks. A voltage-dependent resistor (VDR) 73 is connected parallel to the resistor 72 and to the triac 71, where the voltage-dependent resistor 73 limits possibly occurring overvoltages during interruptions of the triac 71.

The load-control circuit forms together with the motor 11 an economical solution of the problem recited. The load control circuit provides for a substantial reduction of the conventionally usual power dissipation without necessitating decisive constructive steps for the postage metering machine. The load-control circuit offers at all times a safe distinction between differing work loads of the motor 11, independent of overvoltages or undervoltages at the mains plug 18, based on a simultaneous measurement of the motor current i and of the mains voltage U. The differing work loads can thereby be, for example "Idling of the Postage Metering Machine" and "Driving of the Print Rotor". However, it is preferred to provide the distinction between the states "Idling" and "Work Load Caused by a Thick Envelope". The latter load can of course occur only in case of a rotation of the print rotor.

The load-control circuit can be varied relative to the exact circuit of FIG. 2 in a multitude of ways. For example, other semiconductor elements can be employed instead of the triac 71, the current sensor 30 can be of a more elaborate construction, etc. without that the invention as such would be touched by such measures.

I claim:

1. Load-control circuit for an asynchronous motor (11), where the asynchronous motor is operated at a single-phase mains with the aid of a first capacitor (19), wherein a second capacitor (20) is furnished, which can be connected in parallel to the first capacitor (19) by a switch (70), comprises:
   a current sensor (30) for continuously detecting the motor current (i) through the main winding of the motor (11) and for delivering a first direct current signal ($S_1$) proportional to the current (i);
   a voltage sensor (40) for continuously detecting the mains voltage (U) and for delivering a second direct current signal ($S_2$) proportional to the mains voltage; and
   a comparator (25) with relaxation hysteresis for continuously comparing the first direct current signal ($S_1$) and the second direct current signal ($S_2$) and for delivering a switching signal to the switch (70), as long as the first signal ($S_1$) is larger than the second signal ($S_2$).

2. Load-control circuit according to claim 1, wherein the current sensor (30) is a resistor (31) and the voltage sensor (40) is a voltage divider (41, 42), both of said resistor and said voltage divider are connected to a series-connected rectifier and filtering device (32-34; 44-46).

3. Load-control circuit according to claim 1 further comprising:
   a switch control unit (60), said switch control unit is responsive to the switching signal of the comparator (25) for switching the switch (70) at the next following zero passage voltage at the switch (70).

4. Load control circuit according to claim 3 further comprising:
   an optical coupler (55, 61), wherein the optical coupler is connected between the comparator (25) and the switch control unit (60) for purposes of voltage separation.

5. A load-control circuit for a mains-powered asynchronous single-phase capacitor motor comprising:
   a first connection line (13);
   a second connection line (14);
   a third connection line (15), wherein a mains voltage (U) is furnished between the first connection line (13) and the third connection line (15) and wherein a main winding of a motor is connected to the first connection line (13) and to the second connection line (14);
   a first capacitor (19) is connected to a shunt winding of the motor and to the third connection line (15);
   a second capacitor (20) is connected in parallel to the first capacitor (19) by a switch (70);
   a current sensor (30) for continuously detecting the motor current (i) through the main winding of the motor (11) and for delivering a first direct current signal ($S_1$) proportional to the current (i);
   a voltage sensor (40) for continuously detecting the mains voltage (U) and for delivering a second direct current signal ($S_2$) proportional to the mains voltage; and
   a comparator (25) with relaxation hysteresis for continuously comparing the first direct current signal ($S_1$) and the second direct current signal ($S_2$) and for delivering a switching signal to the switch (70), as long as the first signal ($S_1$) is larger than the second signal ($S_2$).

6. The load-control circuit according to claim 5, wherein the current sensor (30) is a resistor (31) inserted into the second connection line (14) and wherein the voltage sensor (40) is a voltage divider (41, 42), and wherein both of said resistor (31) and said voltage divider (41, 42) are connected to a series-connected rectifier and a filtering device (32–34; 44–46).

7. The load-control circuit according to claim 5 further comprising:
a switch control unit (60), wherein the switch control unit (60) is responsive to the switching signal of the comparator (25) for switching the switch (70) at the next following zero passage of the main voltage (U).

8. The load-control circuit according to claim 7 further comprising:
an optical coupler (55, 61), wherein the optical coupler is furnished between the comparator (25) and the switch control unit (60) for the purposes of voltage separation.

9. The load-control circuit according to claim 5 wherein the second capacitor (20) is switched parallel to the first capacitor (19) only during a rotation period of the motor (11) and only in case of a comparatively large load of the motor (11).

* * * * *